US011726214B2

(12) United States Patent
Crohn et al.

(10) Patent No.: US 11,726,214 B2
(45) Date of Patent: Aug. 15, 2023

(54) TWO WINDOW INDICATOR

(71) Applicant: ISP Investments LLC, Wilmington, DE (US)

(72) Inventors: Rob Crohn, Englewood, NJ (US); Shih Hsiao-Yi, Whippany, NJ (US)

(73) Assignee: ISP Investments LLC, Wilmington, DE (US)

( * ) Notice: Subject to any disclaimer, the term of this patent is extended or adjusted under 35 U.S.C. 154(b) by 111 days.

(21) Appl. No.: 17/255,210

(22) PCT Filed: Jun. 28, 2019

(86) PCT No.: PCT/US2019/039762
§ 371 (c)(1),
(2) Date: Dec. 22, 2020

(87) PCT Pub. No.: WO2020/006377
PCT Pub. Date: Jan. 2, 2020

(65) Prior Publication Data
US 2021/0270978 A1    Sep. 2, 2021

Related U.S. Application Data

(60) Provisional application No. 62/692,302, filed on Jun. 29, 2018.

(51) Int. Cl.
*G01T 1/06* (2006.01)
*G01J 1/50* (2006.01)
*G01T 1/08* (2006.01)

(52) U.S. Cl.
CPC .................. *G01T 1/06* (2013.01); *G01J 1/50* (2013.01); *G01T 1/08* (2013.01)

(58) Field of Classification Search
CPC .................. G01T 1/06; G01T 1/08; G01J 1/50
See application file for complete search history.

(56) References Cited

U.S. PATENT DOCUMENTS 3,053,983 A * 9/1962 Faulkner, Jr. ............. G01T 1/08
250/482.1
3,894,238 A 7/1975 Cox et al.
(Continued)

OTHER PUBLICATIONS

References cited in the International Search Report of International Application No. PCT/US19/039762.

*Primary Examiner* — David P Porta
*Assistant Examiner* — Jeremy S Valentiner
(74) *Attorney, Agent, or Firm* — William J. Davis; Nathalie Tietcheu

(57) ABSTRACT

This present disclosure provides a multi-ply radiation dosage indicator, which includes a first ply having two visible readable indicia thereon. The dual radiation sensitive zones are capable of changing opacity in response to exposure radiation. Each radiation sensitive zone can respond to an irradiation dose in tandem or independent of one another. Once the radiation sensitive zone exceeds the design exposure threshold, the visibility of the indicia is altered thereby providing an indication of irradiation exposure. The radiation sensitive zone may either be transparent or opaque and can change its opacity in response to exposure to radiation exceeding a predetermined threshold so as to change the visibility of the indicia.

28 Claims, 8 Drawing Sheets

(56) References Cited

U.S. PATENT DOCUMENTS

| | | | | |
|---|---|---|---|---|
| 5,051,597 A * | 9/1991 | Lewis | ............ | G01T 1/06 |
| | | | | 250/474.1 |
| 8,872,134 B2 | 10/2014 | Patel | | |
| 10,260,955 B2 * | 4/2019 | Freysz | ............ | G01J 1/50 |
| 2005/0285050 A1 * | 12/2005 | Bruce | ............ | G01J 1/429 |
| | | | | 250/474.1 |
| 2007/0117208 A1 * | 5/2007 | Niwa | ............ | C09K 11/7774 |
| | | | | 436/166 |

\* cited by examiner

TWO WINDOW INDICATOR

CROSS-REFERENCE TO RELATED APPLICATIONS

This application is a U.S. National Phase filing under 35 U.S.C. § 371 of International Application No. PCT/US2019/039762 filed Jun. 28, 2019, which claims benefit of priority U.S. Provisional Patent Application No. 62/692,302 filed Jun. 29, 2018. The entire disclosures of which are hereby incorporated in their entirety.

FIELD OF THE INVENTION

The presently disclosed process(es), procedure(s), method(s), product(s), result(s), and/or concept(s) (collectively referred to hereinafter as the "present disclosure or invention") relates generally to a multi-ply radiation dosage indicator, and in particular, to a dosimeter having at least two radiation sensitive zones capable of changing opacity in response to exposure to a radiation to change the visibility of indicia on said indicator, and to a method of manufacturing such indicator.

BACKGROUND OF THE INVENTION

The use of dosimeters to determine the absorbed dose of ionizing radiation received by the person or the substrate to which it is attached is well known. There are many types of dosimeters, the most common being the air-capacitor dosimeter, the film badge and the thermoluminescent dosimeter.

The air-capacitor dosimeter includes an inside chamber which serves as an ion chamber, and a central collecting electrode. An electric charge is placed on the central electrode. Such dosimeters, when charged, are essentially air-capacitors, and the amount of discharge during use is proportional to the absorbed dose of X-ray or gamma ray radiation received. Inherent in the use of such dosimeters is the need of a power source for applying a voltage between the electrode and the chamber wall.

A film badge dosimeter usually is loaded with one or more film packets. The simplest type of film badge consists of a small paper envelope containing a dental film, one-half of which is surrounded by a thin lead foil. The badge must contain one or more filters so that a comparison can be made of the relative blackening of the developed film from behind the various filters. This comparison reveals the extent of exposure to various types of radiation. Inherent in the use of such badge is the need of a developing process to develop the exposed film.

A thermoluminescent dosimeter is one that functions on the principle of thermoluminescence; that is, the property of certain substances that release light upon heating after they have been exposed to ionizing radiation. Inherent in this type of dosimeter is the need for measuring either the peak intensity or the integrated quantity of the light emitted.

While such dosimeters perform satisfactorily, they require outside equipment or processes in order to function and/or be readable. That is, one cannot detect merely by visually observing the exposed material, the level of absorbed radiation.

It also is known to make dosimeters having a substance which changes color when exposed to ionizing radiation. For example, in U.S. Pat. No. 4,001,587 to Georgy Mitrofanovich Panchenkov et al dated Jan. 4, 1977, dosimeters are disclosed which incorporate various dyes, some acid-sensitive and some not acid-sensitive, which change their color on exposure to radiation.

U.S. Pat. Nos. 5,051,597 and 5,084,623 disclose a radiation dosage indicator having a radiation sensitive zone capable of changing opacity in response to exposure to radiation to change the visibility of indicia on said indicator, and to the method of manufacturing such indicator.

U.S. Publication No. 2016/0290859 discloses a film that is specifically manufactured for measuring long wavelength Ultraviolet (UVA) light. More specifically, it relates to a film manufactured for use in indicating an exposure and/or measuring dose of the exposure of long wavelength UV that is commonly used for UV curing of coating, pathogen inactivation and other industrial and medical applications.

U.S. Design Pat. No. 458,642 discloses an ornamental design for a radiation indicator tag.

U.S. Pat. No. 4,536,450 discloses a novel nonlinear optical, piezoelectric, pyroelectric, waveguide, and other materials are presented together with processes for their employment and articles formed thereby.

U.S. Pat. No. 7,445,880 discloses photochromic filaments composed of the lithium salt of a conjugated, polymerizable polyacetylene having a carboxylic acid or carboxylate terminal group.

However, the currently available radiation tags in the market provide either less visibility of indicia or unable to provide clear indication for a required range of radiation. Further, a quick and clear distinction is very important in various applications such as blood transfusion to determine whether the blood is sterilized or not.

Hence, there is a need in industry for an indicator that provides a quick and clear indication for a required range of radiation when the indicator is subjected to a radiation.

SUMMARY OF THE INVENTION

One of the objectives of the present disclosure relates to a multi-ply radiation dosage indicator comprising: a first ply having at least two independent visible indicia thereon; a second ply having at least two independent radiation sensitive zones overlying each independent indicia of said first ply; said each radiation sensitive zone having a changing opacity in response to exposure to a radiation dosage exceeding an independently predetermined threshold of each radiation sensitive zone; and a third ply overlying said second ply and having at least two independent viewing zones through which the respective visible indicia of said first ply is exposed to view, said third ply having at least two independent visible indicia thereon positioned adjacent to each of viewing zone, the indicia of said first ply and the indicia of said third ply together providing a visual indication as to whether said indicator has been exposed to a radiation dosage exceeding the predetermined threshold.

One more objective of the present disclosure relates to multi-ply radiation dosage indicator comprising: a first ply having at least two independent visible indicia thereon; a second ply having at least two independent radiation sensitive zones overlying each independent indicia of said first ply; said each of radiation sensitive zones having a changing opacity in response to exposure to a radiation dosage exceeding an independently predetermined threshold of each radiation sensitive zone to make the indicia of the first ply non-visible; a third ply overlying said second ply and having at least two independent viewing zones through which the each independent visible indicia of said first ply is exposed to view, said third ply having at least two independent visible indicia thereon positioned adjacent to said viewing zone, the indicia of said first ply and the indicia of said third ply together providing a visual indication as to whether said indicator has been exposed to a radiation dosage exceeding the predetermined threshold; and a fourth ply constituting at least two independent optical filters overlying said radiation sensitive zone; and means to attach said indicator to a substrate, and wherein the first and third plies are opaque and have border portions extending beyond the intervening plies, the border portion of the first ply being attached to the border portion of the third ply so as to seal the edges of the intervening plies from exposure to ambient light.

Another objective of the present disclosure relates to a multi-ply radiation dosage indicator comprising: a first ply having at least two first visible readable indicia and at least two second visible readable indicia thereon, said each second indicia positioned adjacent to said each first indicia; a second ply having at least two independent radiation sensitive zone overlying the at least two independent first indicia of said first ply; said second ply being transparent and said radiation sensitive zone becoming sufficiently opaque in response to exposure to a radiation dosage exceeding a predetermined threshold to make the first indicia non-visible and provide a visual readable indication that said indicator has been exposed to a radiation dosage exceeding the predetermined threshold; at least two optical filters overlying said second ply; a third ply overlying said optical filters and having a zone through which the first visible readable indicia of said first ply is exposed to view; means to attach said indicator to a substrate; and wherein said first and third plies being opaque and having border portions extending beyond the intervening plies, the border portion of the first ply being attached to the border portion of the third ply so as to seal the edges of the intervening plies from exposure to ambient light.

A further objective of the present disclosure relates to a method for making a multi-ply radiation dosage indicator comprising: a first ply having at least two independent visible indicia thereon; a second ply having at least two independent radiation sensitive zone overlying the each independent indicia of said first ply; said radiation sensitive zone having a changing opacity in response to exposure to a radiation dosage exceeding a predetermined threshold so as to change the visibility of the indicia; and a third ply overlying said second ply and having at least two viewing zone through which the visible indicator of said first ply is exposed to view, said first and third plies being opaque and having border portions extending beyond the intervening plies, the border portion of the first ply being attached to the border portion of the third ply so as to seal the edges of the intervening plies from exposure to ambient light comprising the steps of: laminating a first ply of said multi-ply indicator to a second ply of said indicator, said first ply having visible indicia thereon and said second ply having a radiation sensitive zone overlying the indicia of said first ply, said radiation sensitive zone having a changing opacity in response to exposure to a radiation dosage exceeding a predetermined threshold; laminating a third ply in overlying relationship to the second ply, the third ply having at least two independent viewing zone through which the each visible indicator of the first ply is exposed to view; and attaching the border portion of the first and third plies to each other to seal the edge of the intervening plies from exposure to ambient light.

Another objective of the present disclosure relates to a method of verifying an absorbed dosage of a radiation comprising the steps of: (a) placing the above described multi-ply radiation dosage indicator in a predetermined radiation field for a predetermined time; (b) verifying each independent visible indicia of said multi-ply radiation dosage indicator; (c) ascertaining progression of color change in each visible indicia; (d) comparing each independent visible indicia; and (e) ascertaining said absorbance of each independent visible indicia for predetermined threshold level of radiation.

BRIEF DESCRIPTION OF THE FIGURES

The invention will be better understood from the following detailed description when read in conjunction with the accompanying drawings. It is emphasized that, according to common practice, the various features of the drawing are not to scale. On the contrary, the dimensions of the various features are arbitrarily expanded or reduced for clarity. The following figures are included in the drawing.

DETAILED DESCRIPTION OF THE INVENTION

Figure 1:
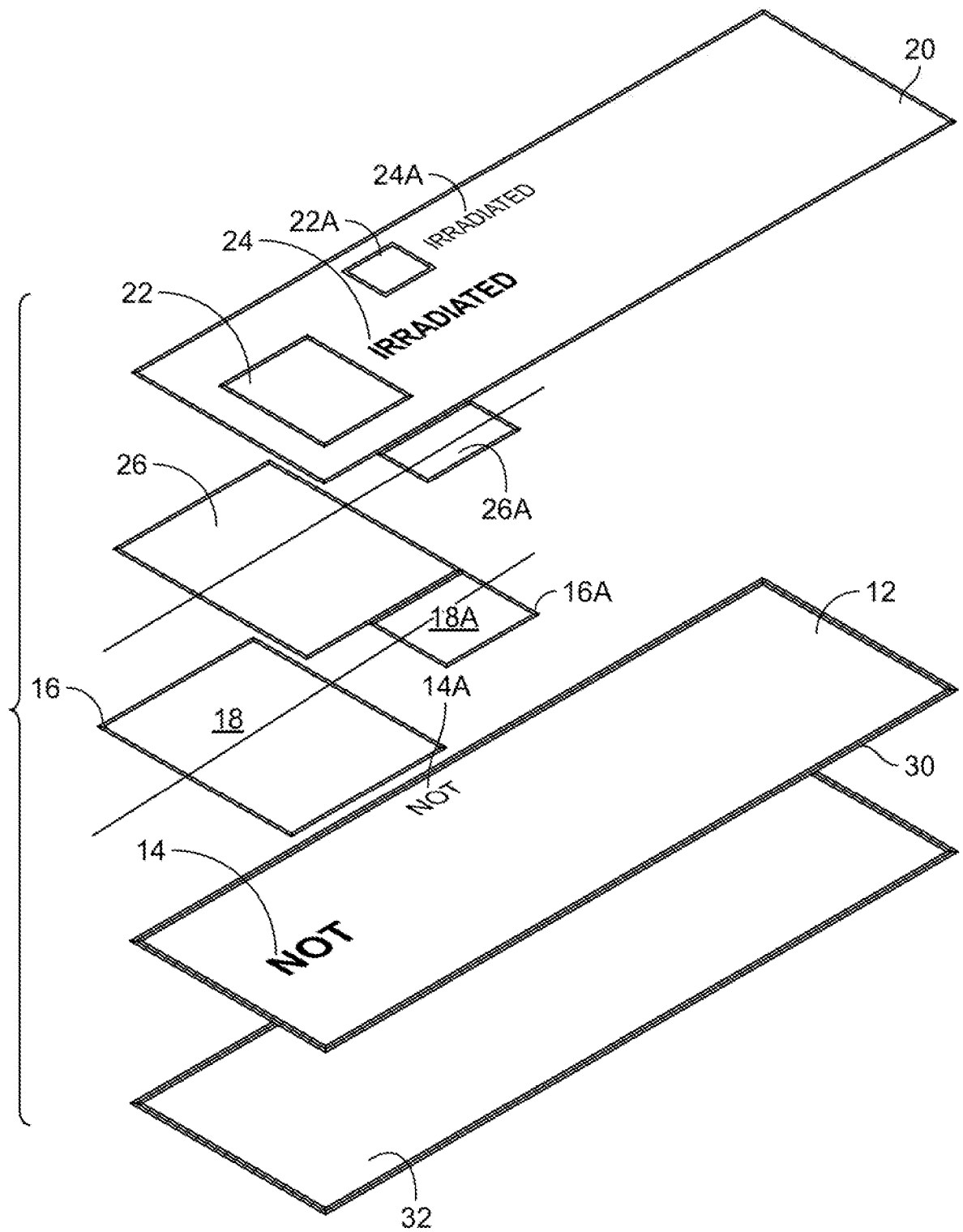
FIG. 1: Is an exploded perspective partial view of one embodiment of the two window (dual window) indicator constructed in accordance with the present disclosure.

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations can be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" can mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this disclosure, the term "about" is used to indicate that a value includes the inherent variation of error for the quantifying device, the method(s) being employed to determine the value, or the variation that exists among the study subjects. For example, but not by way of limitation, when the term "about" is utilized, the designated value can vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" can extend up to 100 or 1000 or more depending on the term to which it is attached. In addition, the quantities of 100/1000 are not to be considered limiting as lower or higher limits can also produce satisfactory results.

References herein to "one embodiment," or "one aspect" or "one version" or "one objective" or "another embodiment," or "another aspect" or "another version" or "another objective" of the present disclosure can include one or more of such embodiment, aspect, version or objectives, unless the context clearly dictates otherwise.

All percentages, parts, proportions, and ratios as used herein are by weight of the total composition, unless otherwise specified. All such weights as they pertain to listed ingredients are based on the active level and therefore do not include solvents or by-products that can be included in commercially available materials, unless otherwise specified.

All references to singular characteristics or limitations of the present disclosure shall include the corresponding plural characteristics or limitations, and vice-versa, unless otherwise specified or clearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB.

Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that can vary depending upon the desired properties to be obtained in carrying out the invention.

The term "or combinations thereof", "and combinations thereof", and "combinations thereof" as used herein refers to all permutations and combinations of the listed items preceding the term.

The term "about" refers to a range of values+10% of a specified value. For example, the phrase "about 200" includes ±10% of 200, or from 180 to 220.

All percentages, ratio, and proportions used herein are based on a weight basis unless other specified.

The present disclosure is directed to a multi-ply radiation dosage indicator comprising: a first ply having at least two independent visible indicia thereon; a second ply having at least two independent radiation sensitive zones overlying each independent indicia of said first ply; said each radiation sensitive zone having a changing opacity in response to exposure to a radiation dosage exceeding an independently predetermined threshold of each radiation sensitive zone; and a third ply overlying said second ply and having at least two independent viewing zones through which the respective visible indicia of said first ply is exposed to view, said third ply having at least two independent visible indicia thereon positioned adjacent to each of viewing zone, the indicia of said first ply and the indicia of said third ply together providing a visual indication as to whether said indicator has been exposed to a radiation dosage exceeding the predetermined threshold.

According to one of the embodiments, a first ply having at least two independent visible indicia having visible readable sensitive zone is provided in overlying relation to the indicia of the first ply. The radiation sensitive zone can either be transparent or opaque and is capable of changing its opacity in response to exposure to radiation exceeding a predetermined threshold so as to change the visibility of the indicia.

In one embodiment of the present disclosure, a third ply can be provided overlying the second ply and having at least two independent radiation sensitive zones overlying each independent indicia of said first ply is exposed to view.

In another embodiment a third ply overlying said second ply and having at least two independent viewing zones through which the respective visible indicia of said first ply is exposed to view, said third ply having at least two independent visible indicia thereon positioned adjacent to each of viewing zone, the indicia of said first ply and the indicia of said third ply together providing a visual indication as to whether said indicator has been exposed to a radiation dosage exceeding the predetermined threshold.

If desired, a fourth ply constituting at least two independent optical filters can overly said second ply. These optical filters, in addition to preventing exposure of the radiation sensitive zone to undesirable radiation, can also serve to enhance the opacity change in the zone.

Still further, a fifth ply constituting a transparent protective outer ply can optionally be provided in overlying relation to the other plies.

For purpose of attaching the indicator to a substrate, the indicator can include a pressure sensitive adhesive ply applied to the bottom of the first ply, with the adhesive ply having a removable release sheet.

In another embodiment, the third ply is eliminated and the indicia that otherwise would have been provided thereon is located on the first ply so as to constitute a ply having first indicia and second indicia thereon. The radiation sensitive zone of the second ply is located in overlying relation to the first indicia and, as previously noted, is capable of changing its opacity to change the visibility of said first indicia. Once, again, the arrangement is such that the first indicia and the second indicia of the first ply together provide a visual readable indication as to whether the indicator has been exposed to a radiation dosage exceeding the predetermined threshold.

An optical filter ply and a transparent protective outer ply can optionally be provided for this embodiment, as was the case with the earlier embodiment, together with a pressure sensitive adhesive ply having a removable release sheet.

Additional features and advantages of the present disclosure will become apparent from a consideration of the following detailed description when taken in conjunction with the accompanying drawings.

Figure 2:
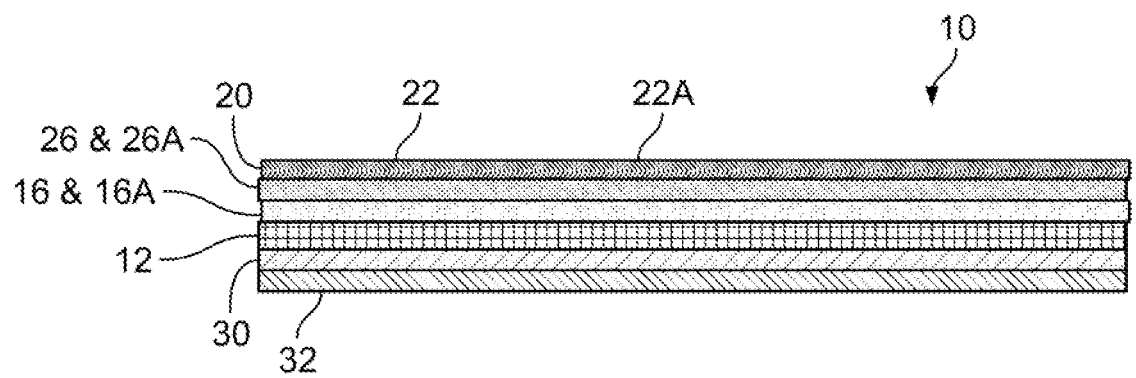
FIG. 2 is a top plan view thereof.
Figure 3A:
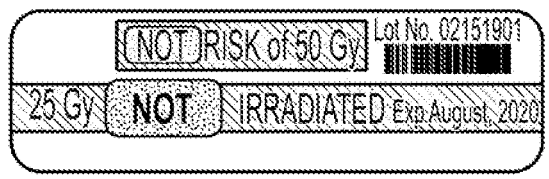
FIG. 3: Illustrated the progression of indicia change resulting for exposure to radiation for a two window (dual window) indicator.
Figure 3D:
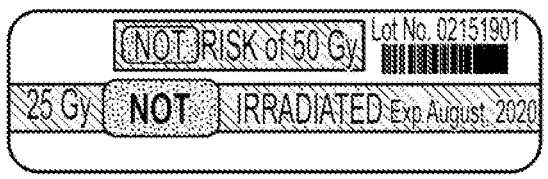
Figure 3B:
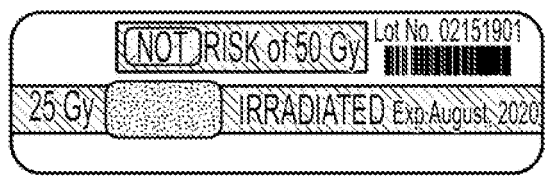
Figure 3E:
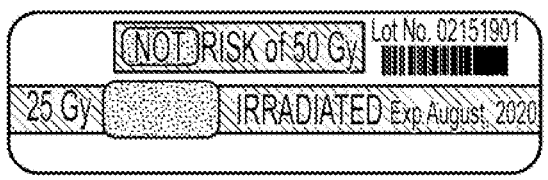
Figure 3C:
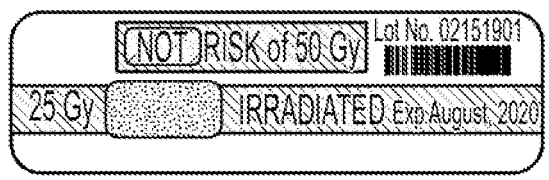
Figure 3F:
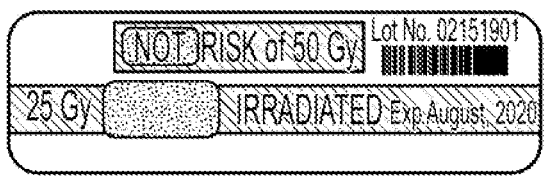
Figure 4:
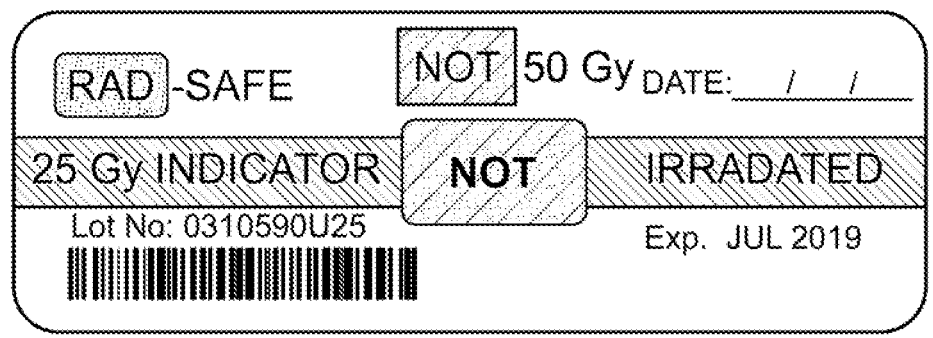
FIG. 4: Depicts the two window (dual window) indicator of the present disclosure.
Figure 5:
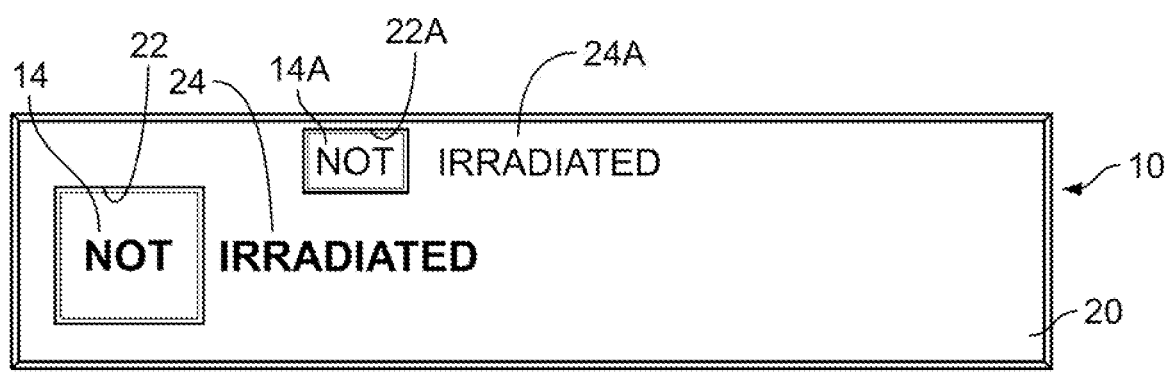
FIG. 5: Is a top plan view thereof.
Figure 6:
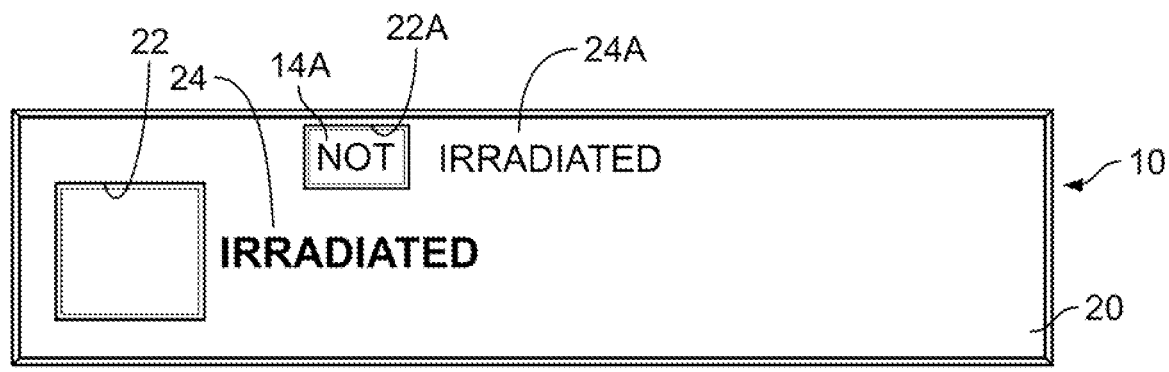
FIG. 6: is a view similar to FIG. 5 wherein lower range of the radiation sensitive zone has become sufficiently opaque in response to exposure to radiation to make various indicia of the indicator non-visible.
Figure 7:
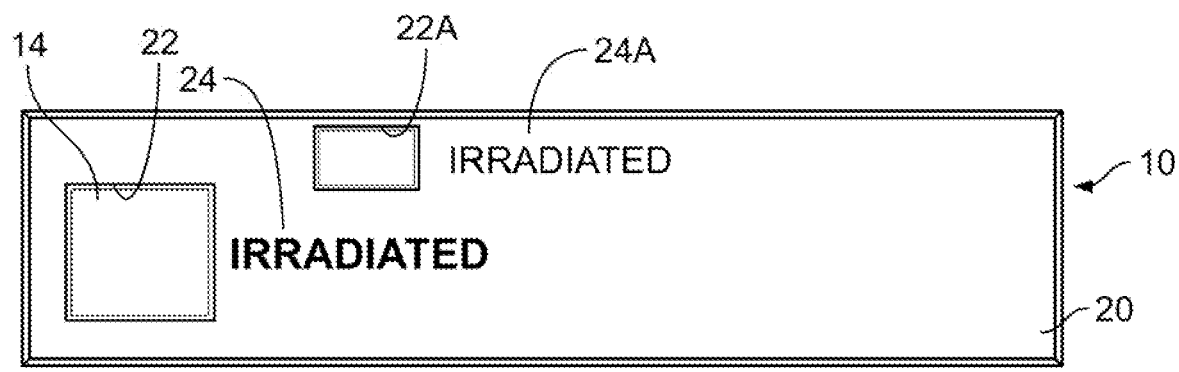
FIG. 7: is a view similar to FIG. 5 wherein the upper range of the radiation sensitive zone has become sufficiently opaque in response to exposure to radiation to make various indicia of the indicator non-visible.

FIGS. 1 and 2 illustrate one embodiment of a multi-ply (dual window) radiation dosage indicator constructed in accordance with the present disclosure. Indicator 10 is formed as a multi ply laminate including a first ply 12 having two visible indicia 14 and 14A thereon. Each indicia, as shown, represents letters forming the word "NOT." However, it is within the scope of the disclosure that the indicia can be symbol or a color, the visibility of which is relied on, as hereinafter described, to provide a visual indication as to whether indicator 10 has been exposed to a radiation dosage exceeding a predetermined threshold. A second ply, which is a combination of 16 and 16A, of transparent material is provided which defines a radiation sensitive ply having two radiation sensitive zone or surface 18 and 18A disposed in overlying relation to the indicia 14 and 14A respectively of first ply 12. Radiation sensitive zone 18 and 18A are capable of changing opacity in response to exposure to radiation exceeding a predetermined threshold so as to change the visibility of indicia 14 and 14A. Adhesive ply 30 has a removable release liner 32 which is adapted to be released from the adhesive ply when indicator 10 is attached to the surface. If desired, the system can comprise a fourth ply 26 constituting an optical filter overlying the radiation sensitive zones of 18 and 18A. A second ply 16 and 16A of transparent material is provided which defines a radiation sensitive ply having at least two radiation sensitive zones or surface 18 and 18A disposed in overlying relation to the indicia 14 and 14A respectively of first ply 12. Radiation sensitive zones 18 and 18A are capable of changing opacity in response to exposure to radiation exceeding a predetermined threshold so as to change the visibility of indicia of 14 and 14A. Suitable for use as the second ply 16 and 16A are films of a radiation sensitive polyacetylenic system that provides a color change caused by polymerization of a polyacetylene material. Such materials can be crystalline or ordered so as to undergo polymerization resulting in a color change. Such systems are disclosed in U.S. Pat. Nos. 4,066,676; 4,581,315; 3,501,310; 3,501,297; 3,501,303; 3,501,308; 3,772,028; 3,884,791; 3,954,816, 4,536,450 and 7,445,880.

A third elongated ply 20 can be provided in overlying relation to plies 12, 16 and 16A. The third ply 20 is formed having a viewing zone in the form of a cut-out 22 and 22A positioned to permit exposure of indicia 14 and 14A there through. Ply 20 also has visible readable indicia 24 and 24A thereon positioned adjacent to viewing zone 22 and 22A respectively. In the illustrated embodiment, indicia 24 and 24A represents letters forming the word "IRRADIATED." The arrangement is such that indicia 14 and indicia 24, and indicia 14A and indicia 24A together provide a visual readable indication as to whether the indicator has been exposed to a radiation dosage exceeding the predetermined threshold. An example of this visible effect is presented in FIG. 3.

Referring to the drawings, and particularly to FIGS. 1 and 2, numeral 10 represents one embodiment of a radiation dosage indicator constructed in accordance with the present disclosure. Indicator 10 is formed as a multi-ply laminate including a first ply 12 having at least two visible indicia 14 thereon. The each indicia, as shown, represents letters forming the word "NOT." However, it is within the scope of the disclosure that the indicia can be symbol, a color, a word or a sentence, the visibility of which is relied on, as hereinafter described, to provide a visual indication as to whether indicator 10 has been exposed to a radiation dosage exceeding a predetermined threshold.

For example, prior to use, indicia 14 and 14A are exposed to view through transparent ply 16 and 16A, and the cut-out portion 22 and 22A of ply 20 so that the combined visible message on indicator 10 reads "NOT IRRADIATED." This visible message serves to indicate that the substrate to which the indicator is attached, e.g., a blood bag, has not been exposed to radiation exceeding a predetermined threshold. However, as a result of exposing indicator 10 to a radiation treatment, the opacity of radiation sensitive zone 18 or 18A changes. This change in opacity takes place over the period of particular level of irradiation. When the amount of radiation to which the radiation sensitive zone has been exposed reaches the predetermined threshold, zone 18 or 18A becomes sufficiently opaque to make indicia 14 or 14A non-visible. As a result, the visible message on indicator 10 now constitutes only indicia 24 and 24A to indicate that the indicator, and the substrate to which it is attached, has become "IRRADIATED."

It will be appreciated that whereas the disclosure provides for radiation sensitive zones 18 or 18A to become opaque in response to exposure to radiation to make indicia 14 or 14A non-visible, it is within the purview of the disclosure that the zone 18 or 18A initially can be opaque and, upon being subjected to radiation, becomes sufficiently transparent thereby to make indicia 14 and 14A visible through viewing zone 22 and 22A respectively. In effect, this would be the reverse operative procedure described above. However, the overall teaching of the present disclosure is the same in that the radiation sensitive zone 18 or 18A changes opacity, in one direction or the other, to change the visibility of indicia 14 or 14A.

The present disclosure further provides for the inclusion, if desired, of a fourth ply 26 constituting an optical filter overlying the radiation sensitive zones of 18 and 18A. In assembly, filters 26 and 26A are sandwiched between the second ply 16 and 16A and the third ply 20. Filter 26 and 26A are intended as a colored optical filter sheet which can serve one or two purposes.

Specifically, filter ply 26 can firstly serve as an optical filter to prevent exposure of zone 18 or 18A to undesirable radiation in a particular part of the spectrum. For example, with a radiation zone designed to be sensitive to electron beam irradiation, it is possible that extraneous radiation present, e.g., ultra-violet, could cause some degree of fogging, which could lead to inaccurate readings of the dosimeter.

Secondly, filter 26 can serve to enhance the opacity change of radiation sensitive zone 18 or 18A. That is, filter 26 can have an optical absorption complementary to the optical absorption provided by the radiation sensitive ply 16 or 16A. In a specific example, both the second ply 16 or 16A and the filter ply 26 are transparent but have different absorption characteristics at different parts of the spectrum. If we assume that the radiation sensitive zone 18 or 18A turns blue upon irradiation, and absent any filter 26 or 26A, it would be necessary for zone 18 or 18A to be exposed to a certain dosage of radiation before becoming sufficiently opaque to render indicia 14 or 14A non-visible. However, if we include a red color filter 26 or 26A as part of the indicator, then filter 26 or 26A complements the blue color of zone 18 or 18A so that zone 18 or 18A need be exposed to a lesser dosage of irradiation in order to create sufficient opacity to prevent visibility of indicia 14 or 14A through the indicator. That is, the presence of filter 26 or 26A decreases the radiation dosage needed to achieve opacity.

In practice, ply 26 or 26A could constitute a separate coated layer on radiation sensitive ply 16 or 16A. It is also within the scope of the present disclosure that the desired color of this coating can instead be contained directly in the substrate or in the radiation sensitive coating whereupon ply 16 or 16A itself also constitutes a colored filter. For example, the color can be produced by a dye or pigment and the dye or pigment could be mixed in with the radiation sensitive coating or the material making up the substrate. The coated layer, which is represented by ply 26 or 26A, is of a thickness suitable to produce the required depth of color in the filter and can be in the range from about 0.01 mil to 100 mil, and preferably is from 0.05 mil to 20 mil.

The present disclosure further provides for an optional fifth ply constituting a transparent protective outer ply which would be disposed in overlying relation to third ply 26 and 26A. The outer ply could serve to prevent indicator 10 from becoming scratched or soiled, and to reduce exposure of the indicator to unwanted ultra-violet light.

In order to permit indicator 10 to be attached to a substrate or other object being subjected to radiation, a pressure sensitive adhesive ply 30 is applied to the bottom of first ply 12. Adhesive ply 30 is provided with a removable release sheet 32 which is adapted to be removed from the adhesive ply when indicator 10 is attached to the substrate.

Aside from adhesive 30, each of the component plies of indicator 10 can be made of plastic, coating on substrate, or paper or other suitable sheet materials. For example, radiation sensitive ply 16 or/and 16A can be composed of a film substrate having a coating of polyacetylene crystals disposed in a binder. The transparent film substrate preferably is made of polyester but other transparent base materials such as, cellulose acetate, cellulose nitrate, nylon, polystyrene, etc., also would be suitable. Gelatin is used as the preferred binder. However, other suitable binders would include polyvinyl alcohol, polyvinylacetate, modified cellulose or starches, and other film forming materials or mixtures thereof familiar to those skilled in the art. The coating of crystalline polyacetylene can be, for example, pentacosa-10, 12-diynoic acid. The coated layer, which can be applied to one or both sides of the substrate, also can contain small amounts of additives commonly used to facilitate such coating, which additives can include, for example, surfactants, dispersants, leveling aids, viscosity modifiers, and the like.

The thickness of ply 16 or 16A should be sufficient to provide mechanical integrity without excessive bulkiness of the dosimeter. The thickness typically might be in the range from about 0.1 mil to 100 mil, and preferably is from about 1 mil to 20 mil. The thickness of the coating is that required to produce the desirable change in opacity and can be in the range from about 0.01 mil to 25 mil, and preferably is from about 0.05 mil to 4 mil. Also, ply 16 or 16A itself could be formed as a laminate of multiple plies as noted more fully in connection with the embodiments.

In manufacturing the laminate constituting indicator 10, the adhesive 30, together with its release sheet 32, is first applied to the bottom surface of ply 12. Ply 16 and 16A are then laminated to the top of ply 12 by means of a transparent adhesive bonding. The bottom surface of ply 20 is then laminated to this composite. In those instances where optical filter ply 26 and 26A are included as part of the indicator, ply of 26 and 26A could be laminated to the upper surface of plies 16 and 16A and then ply 20 could be laminated to the top of plies 16 and 16A.

FIG. 3 illustrates progression of indicia change resulting for exposure to radiation for a two window (dual window) indicator. The figure indicates a text "Risk of 50 Gy" instead of a word "IRRADIATED", referring to FIG. 3 (Series 3 A), this dual window indicator is in the original state. Both "NOT" indicia are clearly visible, within a background field of either red or black. As the dual window indicator is exposed to radiation, in this case 25 Gy (see FIG. 3 (Series 3 B)), the 25 Gy indicator window obscures the "NOT," via a color change of the radiation sensitive polyacetylenic film window. The indicator, the reads 25 Gy "IRRADIATED." At the same time, the second indicia is slightly altered. However, the "NOT" is clearly visible. In this case, the dual indicator reads "NOT" RISK of 50 Gy. Thereby indicating this radiation sensitive polyacetylenic film window has not received 50 Gy radiation exposure. Referring to FIG. 3 (Series 3 C), the 25 Gy indicator window continues to exhibit the obscured "NOT," via a color change of the radiation sensitive polyacetylenic film window. The indicator, the reads 25 Gy "IRRADIATED." This time, the second indicia is more altered. However, the "NOT" continues to be clearly visible. In this case, the dual indicator reads "NOT" RISK of 50 Gy. Thereby indicating this radiation sensitive polyacetylenic film window has not received 50 Gy radiation exposure. Should the indicator receive 50 Gy, or more, radiation exposure, the dual indicator reads RISK of 50 Gy, where the "NOT" would be obscured. Thereby indicating this radiation sensitive polyacetylenic film window has received 50 Gy radiation exposure. FIG. 3 (Series 3 A B C) presents the same logic device but with a different color scheme.

Figure 8:
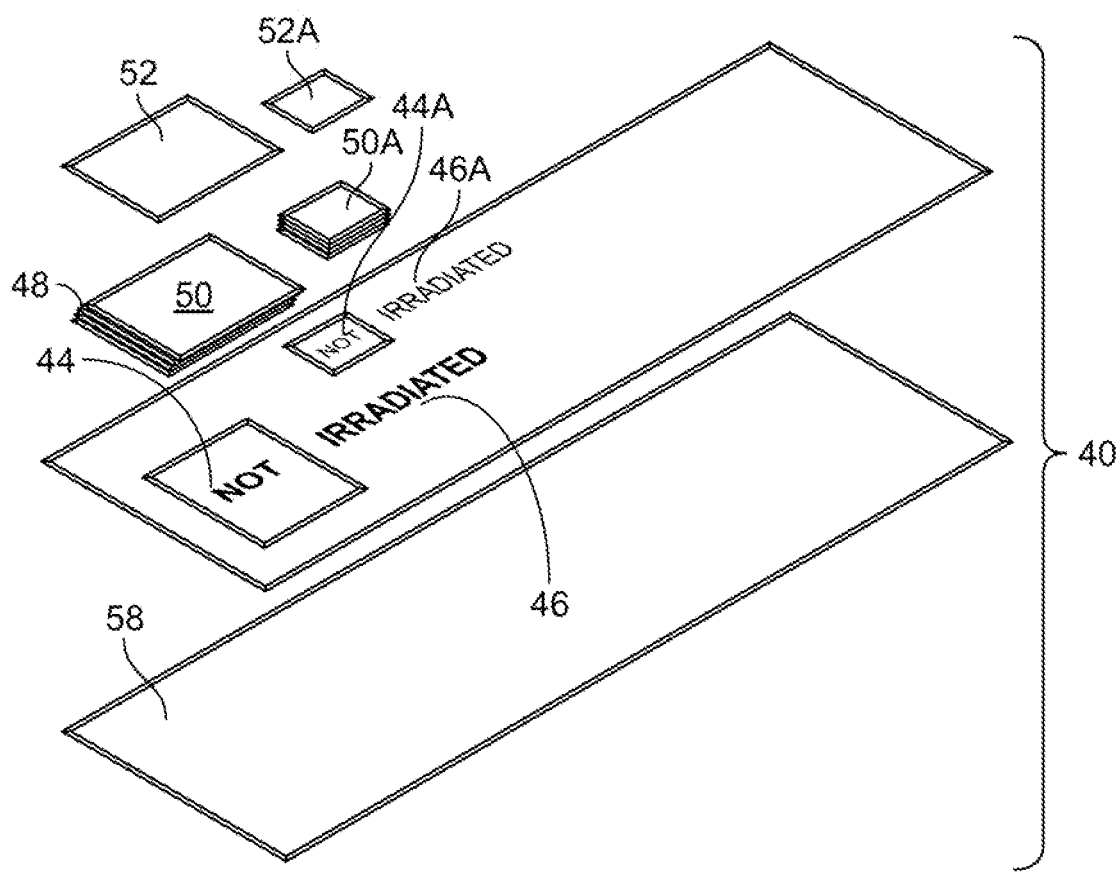
FIG. 8: is an exploded perspective view of another embodiment of the radiation dosage indicator of the present disclosure.
Figure 9:
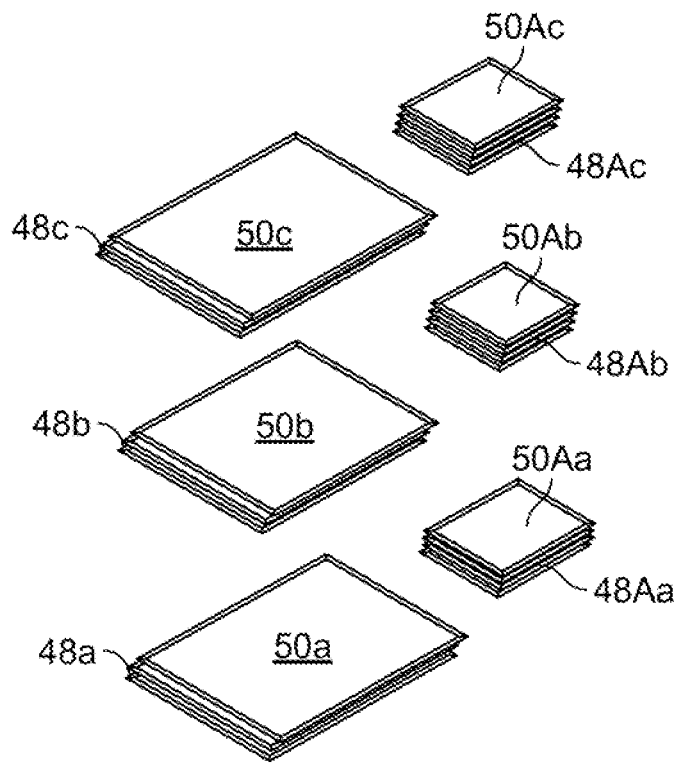
FIG. 9: is an exploded perspective view of two radiation sensitive plies of FIG. 8 which are formed as a laminate.
Figure 10:
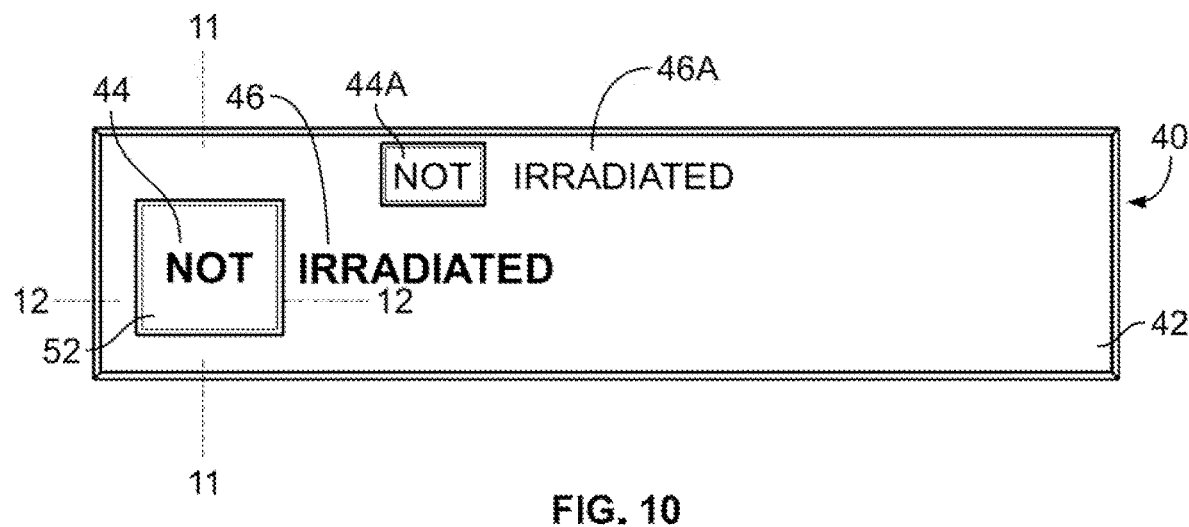
FIG. 10: is a top plan view of the radiation dosage indicator of FIG. 8.

According to another embodiment, each window of indicator is represented in FIGS. 8-10 illustrate of the present disclosure represented by indicator 40 which, similar to indicator 10, also is formed as a multiply laminate. For this embodiment, what was previously identified as the third ply 20 has been eliminated and the indicia 44 and 44A thereon is now incorporated on the base or first ply 42.

Specifically, ply 42 is made of material having first visible indicia 44 thereon forming the word "NOT." Here, again, indicia 44 and 44A can be a symbol or a color similar to indicia 14 or 14A of the first embodiment, the visibility of which is relied on to provide a visual indication as to whether indicator 40 has been exposed to a radiation dosage exceeding a predetermined threshold.

Ply 42 also has second visible readable indicia 46 thereon forming the word "IRRADIATED." Indicia 46 is positioned adjacent to indicia 44 and, taken together with indicia 44, provide a visual readable indication as to whether indicator 40, and the substrate to which it is attached, is irradiated.

A second ply 48 of transparent material is provided which defines the radiation sensitive ply having a radiation sensitive zone or surface 50 disposed in overlying relation to the indicia 44 of first ply 42. As was the case with the first embodiment of FIGS. 8-10, radiation sensitive zone 50 is capable of changing opacity in response to exposure to a radiation dosage exceeding a predetermined threshold so as to change the visibility of indicia 44.

As previously noted, the radiation sensitive plies 16, and 16A can be constructed of multiple plies, each having a radiation sensitive zone. This is shown in FIG. 10 wherein ply 48 is formed as a laminate of separate plies 48a, 48b and 48c, have the radiation sensitive zones 50a, 50b and 50c, respectively. The thickness of the plies 48a 48b and 48c collectively is within the range of ply 16 or 16A. The thickness of each of the polyester plies forming the laminate 48 is approximately 4 mm and the thickness of the crystalline polyacetylene coating is about 1 mm.

Figure 11:
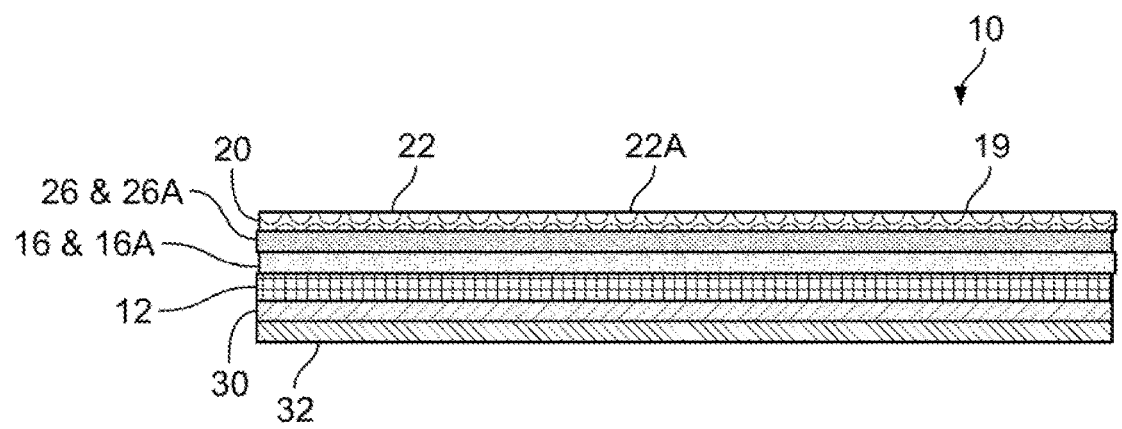
FIG. 11 is an enlarged sectional view taken along the line 11-11 of FIG. 10.

As shown in FIG. 2 which is a view similar to FIG. 11, 12, or/and 13, protective transparent sheet 19 covers ply 20.

According to one of the embodiments and FIG. 11, an optical filter ply 52, similar to filter ply 26 or 26A, is provided overlying the radiation sensitive ply 48. In practice, filter ply 52 is a suitably colored coating on ply 48.

In order to permit indicator 40 to be attached to a substrate or other object being subjected to radiation, a pressure sensitive adhesive ply 56 is applied to the bottom of ply 42. Adhesive ply 56 is provided with a removable release sheet 58 which is adapted to be removed from the adhesive ply when indicator 40 is attached to the substrate. The manufacture of indicator 40 is analogous to that of indicator 10 with the exception of ply 20.

Adhesive ply 56 can extend over the entire length of indicator 40 to facilitate the indicator being more securely affixed to the substrate.

In use, consider the situation where indicia 44 is exposed to view so that the combined visible message on indicator 40 reads "NOT IRRADIATED."

However, as the indicator is exposed the opacity of radiation sensitive zone 50 (that is, zones 50a, 50b and 50c) changes. When the radiation dosage exceeds a predetermined threshold, zone 50 becomes sufficiently opaque to make indicia 44 non-visible, as shown in FIG. 9. As a result, the visible message on indicator 40 now constitutes only indicia 46 to indicate that the indicator, and the substrate to which it is attached, has become "IRRADIATED."

There is thus provided a novel radiation dosage indicator which operatively is a passive device; that is, it does not require any external equipment or procedure in order to indicate when the substrate has been exposed to a radiation dosage exceeding a predetermined threshold. There is no separate chemical processing, developing or heating required in order for the indicator to function. The indicia is easily and instantaneously readable, and provides a permanent record as to the radiation exposure. That is, once the indicator indicates that the substrate has become irradiated, the indicator can be suitably marked and stored for future reference. The indicator does not have to be exposed to any chemical developer nor be exposed to a vapor or gas or etchant liquid.

In the embodiments depicted and described hereinabove, the edges of the various plies are all in register. This can be seen, in particular, from FIGS. 1, 2 and 8-10. However, we have found, that in certain instances, it is possible that very small amounts of ambient light striking the surface of the plies can seep through ply 20 and/or ply 12. Thus, while these plies can ordinarily, be made of paper or plastic material which can be filled with an opaque pigment, for example, titanium dioxide and the like, such papers are not completely opaque to light. Over extended periods of time under ambient lighting, it is possible for small amounts of light to be transmitted through such plies.

Referring to FIGS. 1 and 2, in instances where an optical filter ply 26 or 26A is employed above the radiation sensitive ply 16, the seepage of ambient light through ply 20 can cause changes in the opacity of radiation sensitive zone. However, the entry of light through the ply 12 can also have an acute adverse effect if the dosimeter label is attached to a transparent substrate. We have found, for example, that after about twenty days, it is possible for a sufficient amount of light to be transmitted through such a ply so as to result in an undesirable change in visibility of the radiation sensitive zone.

As a result, we have particularly discovered that it is best if the outer plies, such as plies 20 and 12, be made of a completely opaque material, for example, a metallic foil, black plastic tape, e.g., so called "electrical tape" or a metallic foil coated paper or plastic.

To demonstrate this phenomenon, two dosimeters having the embodiment of FIG. 1, with the exception that adhesive layer 30 and release layer 32 were not present, were placed in side-by-side relationship on an opaque support sheet. The dosimeters were modified in that an opaque, black plastic tape was placed on the exterior surface of ply 12 (that surface which would normally be covered with adhesive) such that it was opposite to and overlaid one-half of the radiation sensitive zone 18 (ply 16) which is on the opposite side of ply 12. Thus, the covered portion of zone 18 was shielded from illumination. The dosimeters were placed face-down, i.e., with ply 20, contacting the support surface. The support was mounted approximately 4 inches below the center of a cool-white fluorescent light source so that ply 12 faced the light and was illuminated. The power density in the visual spectrum at the sample level was measured to be approximately 60 microwatts/cm$^2$. The indicators were exposed to this light source for twenty-one days. Inspection of the indicators after the test period showed that the indicia in that portion of the radiation sensitive zone covered by the opaque tape were still clearly and distinctly visible. In contrast, in the adjacent, unprotected zone (the zone not covered with the tape), the indicia had been rendered totally invisible. This demonstrates that the radiation sensitive zone is affected by light in the visible spectrum when subjected to such light over an extended period of time. It further shows that this sensitivity can be counteracted by making certain that the first ply is completely opaque.

We have also found that for embodiments such as those depicted in FIGS. 1, 2, 5-7 and 10-11, wherein the edges of each of the plies or radiation sensitive zone are in register, it is possible for light leakage or "piping" to occur through the edges of the plies. Thus, for example, it is possible for ambient light striking the edges, to enter into the laminate through the side edges of those plies which can be partially or completely transparent to light. As a result, if the first ply is made of paper or a plastic, light can seep into the laminate through the edge and, over an extended period of time, adversely affect the radiation sensitive zone. As a result, this detrimentally affects the long term storage properties of such laminates.

We have further discovered that this can be avoided by making the first and third plies larger in area than the intermediate plies. This results in the borders of the first and third plies extending beyond the edges of the intermediate plies and allows these borders to be sealed together thereby completely enclosing or enveloping the intermediate plies. Further, when the first and third plies are formed from a completely opaque material, i.e., a black electrical-type tape or a foil coated paper or plastic, and the edges are sealed together, resulting in complete encapsulation, of the intermediate plies including the radiation sensitive zone, the light leakage can be completely avoided.

Figure 12:
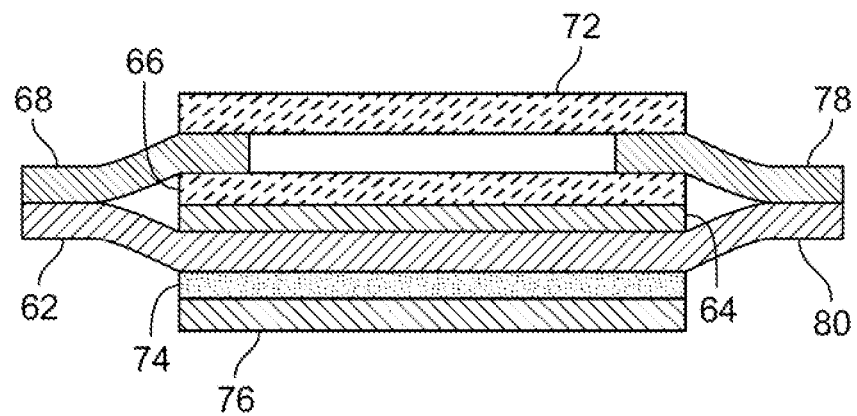
FIG. 12 is an enlarged sectional view taken along the line 12-12 of FIG. 10.
Figure 13:
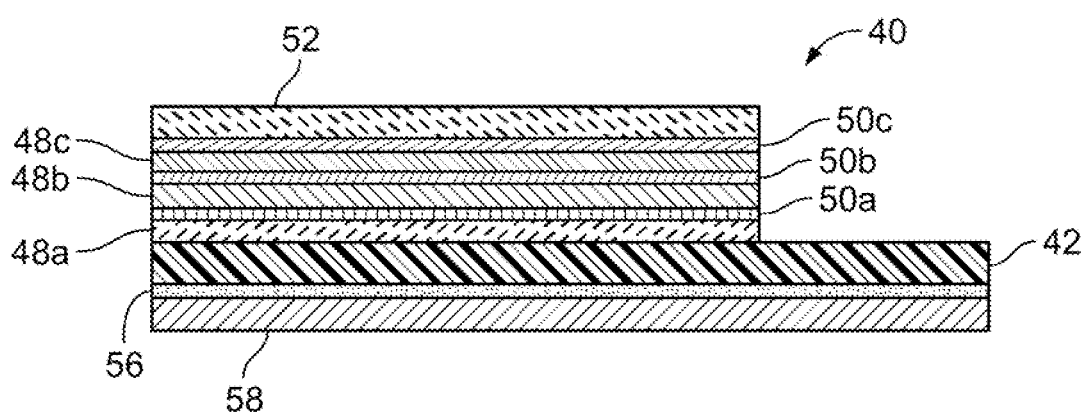
FIG. 13 is a sectional view taken along line 13-13 of FIG. 14.
Figure 14:
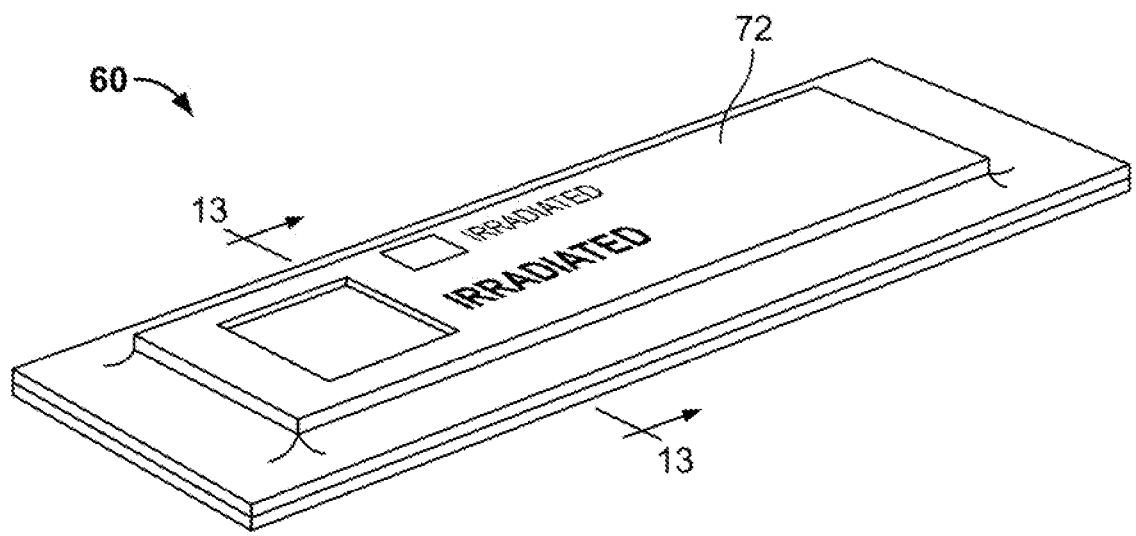
FIG. 14 is a perspective view of another embodiment of the disclosure.

FIGS. 12 and 13 depicts an embodiment of the inventive dosimeter which provides protection against ambient light affecting the radiation sensitive zone either by passage through the first or third or outer plies and/or leakage through the edges of the laminate. As shown therein, radiation dosage indicator 60 has a constitution similar to that shown in FIGS. 1 and 2. Referring specifically to FIG. 12, a first ply 62 having indicia thereon is shown. This ply corresponds to ply 12 of FIGS. 1 and 2. A second ply 64 is shown on top of ply 62 which corresponds to ply 16 of FIGS. 1 and 2. This ply contains a radiation sensitive zone corresponding to radiation sensitive zone 18 of FIGS. 1 and 2. A third ply 66, overlying the radiation sensitive zone of ply 64 and constituting a filter corresponding to filter 26 of FIGS. 1 and 2, is applied onto ply 64. Thereafter in overlying relationship to plies 64 and 66, a fourth elongated ply 68 is shown corresponding to ply 20 of FIGS. 1 and 2. This ply has a cut-out portion constituting a viewing zone similar to cut-out zone 22 of FIGS. 1 and 2.

Also shown is a top protective transparent ply 72, an adhesive ply 74 and release sheet ply 76 corresponding to the same respective plies as shown in FIG. 1.

Of importance in FIGS. 12 and 13 is the fact that plies 62 and 68 having dimensions which are greater in both their length and width than intervening plies 66 and 64. This allows the border portions 78 of ply 68, and 80 of ply 62 to overhang intervening plies 64 and 66 on all sides. The overhanging border portions 78 and 80 are then married together so as to completely seal intervening plies 64 and 66 and form an encasement or envelope therefor. Overlapping portions 78 and 80 are sealed together as by an adhesive, heat, or other means so as to make the interface thereof impervious to light. In addition, plies 62 and 68 are formed from a completely opaque material, such as, a black plastic tape, foil or foil coated paper. As a result, in this embodiment, ambient light is completely prevented from leakage into the encased portion of plies 62 and 68, thus avoiding irradiation of radiation sensitive zone 70 by small but incremental amounts of ambient light. In particular, this embodiment assures that light cannot leak into the interior of the dosimeter through the edges.

The improvement obtained by this embodiment has been demonstrated by placing three radiation dosage indicators face up (window side up) on an opaque support. The first indicator was constructed in accordance with FIGS. 1 and 2 wherein the edges of the radiation sensitive zone were in register with the edges of the other plies and were exposed to incident illumination. The second indicator was constructed in accordance with FIG. 12, with the first and third plies being translucent, and extending to cover the edges of the radiation sensitive zone. The third indicator was constructed similarly to the second except that the first and third plies were completely opaque thereby shielding the edges of the radiation sensitive zone from illumination.

The support was mounted approximately 22" below a cool-white fluorescent light source. The power density in the visual spectrum at the plane of the samples was measured and was approximately 48 microwatts/cm$^2$. The radiation dosage indicators were exposed to this light source for approximately 48 days. At the conclusion of the test, the indicators were inspected and the following observations were made:

The radiation sensitive zone of the first indicator had darkened sufficiently such that the underlying indicia were barely visible. Similarly, the radiation sensitive zone of the second indicator had darkened such that its indicia were barely visible. The third indicator in accordance with the above described embodiment, showed no appreciable darkening of the radiation sensitive zone and its indicia were clearly visible.

The inventive indicator can be utilized to measure a wide variety of types of electromagnetic radiation including low energy radiation, which is radiation having wave lengths within the visible range, ultra-violet, infra-red, as well as high-energy radiation, i.e., radiation having wave lengths in the range of X-rays, gamma rays, electron beam, and the like (See Encyclopedia of Science & Technology, McGraw-Hill, 1982, Fifth Ed., pp. 627). Typically, for example, the radiation sensitive zone will be sensitive to radiation having an energy level of at least about 1 eV. Understandably, those plies which are interposed between the source of radiation and the radiation sensitive zone, for example, in FIG. 1A, ply 26 and 26A must be adapted in terms of their thickness and composition so as to allow the specific type of radiation to which the radiation sensitive zone is sensitive and which it is desired to measure, to penetrate. Thus, those plies interposed between the radiation sensitive zone and source of radiation must be transparent to the type of radiation. High energy radiation, e.g., x-rays and gamma-rays are particularly penetrating and, for all practical purposes, will penetrate most materials which might be disposed in front of the radiation sensitive zone. However, for lower energy radiation, e.g., ultra-violet, the plies in front of the radiation zone must be chosen carefully so as not to interfere with the penetration of the radiation wave lengths which it is desired to measure.

Particle radiation, such as, electron beam and alpha particles have an intermediate energy level. Consequently, the thickness of those layers in front of the radiation sensitive zone must be chosen so as to be consistent with the energy level of the particle radiation been measured. Typically, when the inventive dosimeter is to be utilized for material processing or sterilization, an electron beam having an energy level of about 250 KeV or more would be used. Such radiation will penetrate organic plastics, e.g., polyethylene film and the like, up to a thickness of about 20 mil.

The threshold level, i.e., amount of radiation that would cause the radiation sensitive layer to change its opacity sufficiently to make the indicia readable or not readable, will depend upon the specific purpose for which the inventive dosimeter is being used as well as the specific wave length of radiation to which the radiation sensitive layer is sensitive. Typically, for example, for dosimeters used to detect x-rays, gamma rays and electrons, a radiation sensitive layer which changes opacity after a dosage of from about $10^{-3}$ to $10^8$ rads can be used. For certain uses, e.g., blood irradiation, a threshold dosage of from about $10^2$ to $10^4$ rads would be suitable. Particularly suitable would be a threshold dosage of about 1,500 to 4,500 rads.

For a radiation sensitive layer which is responsive to ultra-violet and which would be used for measurement of ultra-violet dosage, dosage levels in the range from about $10^{-8}$ J/cm$^2$ to $10^3$ J/cm$^2$ would be suitable.

While preferred embodiments of the present disclosure have been shown and described in detail, it will be readily understood and appreciated that numerous omissions, changes and additions can be made without departing from the spirit and scope of the present disclosure.

The designs of multi-ply radiation dosage indicator according to the present disclosure can be prepared and used according to the description above. These designs are presented herein for purposes of illustration of the present disclosure and are not intended to be limiting, for example, the making and using of the multi-ply radiation dosage indicator.

We claim:

1. A multi-ply radiation dosage indicator comprising:
   a first ply having a first visible indicia and a second visible indicia thereon;
   a second ply having a first radiation sensitive zone and a second radiation sensitive zone, wherein the first radiation zone is configured to overlay the first visible indicia and the second radiation zone is configured to overlay the second visible indicia;
   wherein each radiation sensitive zone is configured to change opacity in response to exposure to a certain radiation dosage exceeding an independently predetermined threshold of each radiation sensitive zone; and
   a third ply overlying the second ply comprising at least a first viewing zone, a second viewing zone, a first visible indicia and a second visible indicia,
   wherein the first visible indicia and the second visible indicia of the first ply are configured to be exposed to view through the first viewing zone and the second viewing zone of the third play, respectively, and the first visible indicia and the second visible indicia of the third ply are positioned adjacent to the first viewing zone and the second viewing zone, respectively, the first visible indicia and the second visible indicia of the first ply and the first visible indicia and the second visible indicia of the third ply together providing a visual indication as to whether the indicator has been exposed to a radiation dosage exceeding the predetermined threshold.

2. The multi-ply radiation dosage indicator of claim 1, wherein the second ply is selected from a group consisting of a layer, a film, a coating, a sticker, and a paper.

3. The multi-ply radiation dosage indicator of claim 1, wherein the first radiation sensitive zone and the second radiation sensitive zone is are transparent and are configured to become sufficiently opaque in response to exposure to a certain dose of radiation to make the first visible indicia of the first ply non-visible, the second visible indicia of the first ply non-visible, or both the first and second visible indicia of the first ply non-visible.

4. The multi-ply radiation dosage indicator of claim 1, wherein the first radiation sensitive zone of the second ply, the second radiation zone of the second ply, or both the first and second radiation sensitive zones of the second ply are opaque and configured to become sufficiently transparent in response to exposure to a certain dose of radiation to make the first visible indicia of the first ply visible, the second visible indicia of the first ply visible, or both the first and second visible indicia of the first ply visible.

5. The multi-ply radiation dosage indicator of claim 1, further comprising an optical filter ply overlying the second ply.

6. The multi-ply radiation dosage indicator of claim 1, further comprising a transparent protective outer ply.

7. The multi-ply radiation dosage indicator of claim 1, wherein the first viewing zone and the second viewing zone of the third ply are defined by at least a first and second cut-out windows.

8. The multi-ply radiation dosage indicator of claim 1, further comprising a fourth ply comprising at least two independent optical filters, wherein the fourth ply is configured to overlay the second ply.

9. The multi-ply radiation dosage indicator of claim 1, further configured to be removably or permanently attachable to a substrate.

10. The multi-ply radiation dosage indicator of claim 9, wherein the indicator is configured to be attached to the substrate with a pressure sensitive adhesive ply disposed between the first ply and a removable release sheet.

11. A multi-ply radiation dosage indicator comprising:
    a first ply having at least a first visible indicia, a second visible indicia, a third visible indicia, and a fourth visible indicia, wherein the first visible indicia is positioned adjacent to the third visible indicia and the second visible indicia is position adjacent to the fourth visible indicia on the first ply;
    a second ply having at least a first radiation sensitive zone and a second radiation sensitive zone, wherein the first radiation zone is configured to overlay the first visible indicia and the second radiation zone is configured to overlay the second visible indicia;
    wherein each radiation sensitive zone is configured to change opacity in response to exposure to a certain radiation dosage exceeding an independently predetermined threshold of each radiation sensitive zone; and
    wherein the first and second visible indicia coupled with the third and fourth visible and the second indicia, respectively, together providing a visual indication as to whether said the indicator has been exposed to a certain radiation dosage exceeding one or more the predetermined thresholds.

12. The multi-ply radiation dosage indicator of claim 11, further comprising an optical filter ply overlying the second ply.

13. A multi-ply radiation dosage indicator comprising:
a first ply having at least a first and a second visible indicia thereon;
a second ply having at least a first radiation sensitive zone and a second radiation sensitive zone, wherein the first radiation sensitive zone is configured to overlay the first visible indicia and the second radiation sensitive zone is configured to overlay the second visible indicia;
wherein the first radiation sensitive zone and the second radiation sensitive zone comprise a polyacetylene compound having the capability to change opacity in response to exposure to a certain radiation dosage that exceeds an independently predetermined threshold of each radiation sensitive zone to make the first visible indicia, the second visible indicia, or both the first and second visible indicia of the first ply nonvisible;
a third ply overlying the second ply, the third ply including at least a first and second viewing zones, through which the first and second visible indicia of said first ply may be exposed to view, the third ply further includes a first and second visible indicia thereon positioned adjacent to the first and second viewing zones, respectively, the first and second visible indicia of said first ply and the first and second visible indicia of said third ply together providing a visual indication as to whether the indicator has been exposed to a certain radiation dosage exceeding the predetermined threshold(s); and
a fourth ply constituting at least a first and second optical filters configured to overlay the first and second radiation sensitive zones, respectively;
wherein the indicator is configured to be removably or permanently attachable to a substrate, and wherein the first and third plies are opaque and have border portions extending beyond the second and fourth plies, the border portion of the first ply being attached to the border portion of the third ply, sealing the edges of the second and fourth plies from exposure to ambient light.

14. The multi-ply radiation dosage indicator of claim 13, wherein the indicator is configured to be attached to the substrate with a pressure sensitive adhesive ply disposed between the first ply and a removable release sheet.

15. The multi-ply radiation dosage indicator of claim 13, wherein the second ply is a laminate of multiple layers, each having a radiation sensitive zone in overlying relation to each other.

16. The multi-ply radiation dosage indicator of claim 13, wherein each radiation sensitive zone is sensitive to radiation having an energy level of at least from about 1 eV.

17. The multi-ply radiation dosage indicator of claim 16, wherein each radiation sensitive zone is sensitive to high energy radiation and the threshold dosage is in the range from about $10^2$ to $10^4$ rads.

18. The multi-ply radiation dosage indicator of claim 16, wherein each radiation sensitive zone is sensitive to high energy radiation and the threshold dosage is in the range from about 1,500 to 4,500 rads.

19. The multi-ply radiation dosage indicator of claim 16, wherein each radiation sensitive zone is sensitive to low energy radiation and the threshold dosage is in the range from about $10^{-8}/cm^2$ to $10^3$ $J/cm^2$.

20. The multi-ply radiation dosage indicator of claim 16, wherein each radiation sensitive zone is sensitive to high energy radiation and the threshold dosage is in the range from about $10^3$ to $10^8$ rads.

21. The multi-ply radiation dosage indicator of claim 20, wherein one or more of the radiation sensitive zones comprise a polyacetylene compound, a lithium salt of polyacetylene, a polyacetylene monomer coated on a piezoelectric element, or a combination thereof.

22. A multi-ply radiation dosage indicator comprising:
a first ply having a first visible readable indicia, a second visible readable indicia, a third visible readable indicia, and a fourth visible readable indicia thereon, the first visible readable indicia positioned adjacent to the third visible readable indicia and the second visible readable indicia position adjacent to the fourth visible readable indicia;
a second ply having at least a first radiation sensitive zone and a second radiation sensitive zone configured to overlay the first and the second visible readable indicia, respectively;
wherein the second ply is configured to be transparent and the first and second radiation sensitive zone(s) are configured to become sufficiently opaque in response to exposure to a certain radiation dosage that exceeds a predetermined threshold, making the first and second visible readable indicia nonvisible and providing a visual readable indication that the indicator has been exposed to the certain radiation dosage exceeding the predetermined threshold;
at least two optical filters overlying said second ply;
a third ply overlying the optical filters and having at least one zone through which the first visible readable indicia and the second visible readable indicia of the first ply are configured to be exposed to view;
wherein the indicator is configured to be removably or permanently attachable to a substrate; and
wherein the first and third plies are opaque and further comprise border portions extending beyond the second and fourth plies, the border portion of the first ply being attached to the border portion of the third ply so as to seal the edges of the second and fourth plies from exposure to ambient light.

23. A method for making a multi-ply radiation dosage indicator comprising:
providing a first ply having at least a first and second visible indicia thereon;
providing a second ply having at least a first and second radiation sensitive zone overlying the first and second independent indicia of said first ply, respectively; the first and second radiation sensitive zones configured to change opacity in response to exposure to a radiation dosage exceeding a predetermined threshold so as to change the visibility of the first and second indicia therethrough; and
providing a third ply overlying the second ply and having at least a first and second viewing zones through which the first and second visible indicia of the first ply are exposed to view, the first and third plies being opaque and having border portions extending beyond the second ply;
laminating the first ply to the second ply;
laminating the third ply in overlying relationship to the second ply; and
attaching the border portions of the first and third plies to each other to seal the edge of the second ply from exposure to ambient light.

24. The method of claim 23, wherein the first and second radiation sensitive zones are transparent and become sufficiently opaque in response to exposure to a radiation dosage to make the first and second visible indicia non-visible.

25. The method of claim 23, wherein the third ply further comprises a first and second visible indicia thereon, and wherein the first and second visible indicia of the third ply are positioned adjacent to the first and second viewing zones, the first and second visible indicia of the first ply and the first and second visible indicia of the third ply together providing a visual indication as to whether the indicator has been exposed to a radiation dosage exceeding the predetermined threshold.

26. The method of claim 25, further comprising the step of providing an optical filter ply and laminating the optical filter ply to the second ply prior to laminating the first and second plies to the third ply, the optical filter ply being sandwiched between the second ply and the third ply and overlying the first and second radiation sensitive zones.

27. The method of claim 26, further comprising the step of providing a transparent protective outer ply and laminating the transparent protective outer ply to the third ply in overlying relation thereto.

28. The method of claim 27, further comprising the step of applying a pressure sensitive adhesive ply to the bottom of the first ply, the adhesive ply including a removable release sheet.

\* \* \* \* \*